(12) United States Patent
Hosokawa

(10) Patent No.: US 10,837,751 B2
(45) Date of Patent: Nov. 17, 2020

(54) STEP GAUGE FOR STRINGED MUSICAL INSTRUMENTS AND METHOD OF USING SAME

(71) Applicant: HOSCO, Inc., Nagoya (JP)

(72) Inventor: Shinji Hosokawa, Nagoya (JP)

(73) Assignee: HOSCO, Inc., Nagoya (JP)

( * ) Notice: Subject to any disclaimer, the term of this patent is extended or adjusted under 35 U.S.C. 154(b) by 200 days.

(21) Appl. No.: 16/234,770

(22) Filed: Dec. 28, 2018

(65) Prior Publication Data

US 2019/0212122 A1 Jul. 11, 2019

Related U.S. Application Data

(60) Provisional application No. 62/613,963, filed on Jan. 5, 2018.

(51) Int. Cl.
| | |
|---|---|
| *G01B 3/04* | (2006.01) |
| *G01B 5/02* | (2006.01) |
| *G10G 7/00* | (2006.01) |
| *G10D 3/00* | (2020.01) |

(52) U.S. Cl.
CPC ............ *G01B 5/02* (2013.01); *G01B 3/04* (2013.01); *G10D 3/00* (2013.01); *G10G 7/00* (2013.01)

(58) Field of Classification Search
CPC ...................................................... G01B 3/004
USPC ........................................ 33/494, 548, 679.1
See application file for complete search history.

(56) References Cited

U.S. PATENT DOCUMENTS

| | | | | |
|---|---|---|---|---|
| 2,014,741 A | * | 9/1935 | Lesti ...................... | G10H 3/00 84/639 |
| 2,292,232 A | * | 8/1942 | Liske ...................... | G01D 3/04 84/312 R |
| 2,767,475 A | * | 10/1956 | Sekora ..................... | G01B 5/00 33/679.1 |
| 2,948,064 A | * | 8/1960 | Wentsel ................. | A47G 21/00 30/123 |
| 3,169,700 A | * | 2/1965 | Healy ..................... | G06G 1/14 235/61 B |
| 3,250,010 A | * | 5/1966 | Smith ................. | E04G 21/1808 33/679.1 |
| 4,584,774 A | * | 4/1986 | Link ....................... | G01B 3/30 33/202 |

(Continued)

*Primary Examiner* — George B Bennett
(74) *Attorney, Agent, or Firm* — MKG, LLC

(57) ABSTRACT

A single-tool step gauge provides for measuring or setting a preferred or desired height of a string above a surface of a stringed musical instrument, and includes a nut slot gauge, crown height gauge and string action gauge. The nut slot gauge includes a downwardly-extending tab, a first plurality of integrally-formed graduated length gauges that measure a nut slot height, and a first plurality of measurement indications corresponding to the first plurality of graduated length gauges. The crown height gauge includes a pair of feet, a second plurality of integrally-formed graduated length gauges that measure a fret crown height, and a second plurality of measurement indications corresponding to the second plurality of graduated length gauges. The string action gauge includes a base, a third plurality of graduated length gauges that measure a string action, and a third plurality of measurement indications corresponding to the third plurality of graduated length gauges.

14 Claims, 8 Drawing Sheets

(56) References Cited

U.S. PATENT DOCUMENTS

| | | | | |
|---|---|---|---|---|
| 4,977,811 A * | 12/1990 | Suzuki | ............... | A61B 5/1071 |
| | | | | 310/338 |
| 5,253,427 A * | 10/1993 | Bartlett | ................ | G01B 3/30 |
| | | | | 33/501.08 |
| 5,309,648 A * | 5/1994 | Allard | ................. | G01B 3/30 |
| | | | | 33/511 |
| 5,505,002 A * | 4/1996 | Falco | ................. | A41D 25/00 |
| | | | | 2/144 |
| 5,671,541 A * | 9/1997 | Dai | ................. | G01B 3/30 |
| | | | | 33/502 |
| 6,725,559 B2 * | 4/2004 | Burt, Jr. | ............. | A41H 3/002 |
| | | | | 33/11 |
| 6,901,672 B1 * | 6/2005 | Reilly | ................ | G01B 3/30 |
| | | | | 33/501.45 |
| 7,472,488 B2 * | 1/2009 | Besch | ................ | A01K 29/00 |
| | | | | 33/511 |
| 2006/0156570 A1 * | 7/2006 | James | ................ | G01B 3/28 |
| | | | | 33/679.1 |
| 2015/0201866 A1 * | 7/2015 | Wojcieszak | ........... | A43D 1/04 |
| | | | | 33/512 |
| 2020/0182598 A1 * | 6/2020 | Lowitz | ................ | G01B 3/56 |

\* cited by examiner

STEP GAUGE FOR STRINGED MUSICAL INSTRUMENTS AND METHOD OF USING SAME

CROSS-REFERENCE TO RELATED APPLICATIONS

This patent application claims priority to U.S. Provisional Patent Application No. 62/613,963, filed on Jan. 5, 2018, the disclosure of which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to an apparatus and a method for measuring or setting a height for a string above a surface of a stringed instrument. More particularly, the present invention is directed to a single-tool step gauge for measuring or setting a preferred or desired height of a string above a surface of a stringed instrument.

2. Related Art

In general, a stringed musical instrument includes a body, a neck and a headstock. A plurality of strings extend from a first end to a second end, namely, from the body, along a length of the neck, and to the headstock of the stringed musical instrument. For example, a conventional acoustic guitar has six strings, while a conventional bass guitar has four strings. The first end of each string is respectively mounted to a bridge pin on a bridge disposed on the body and the second end of each string is respectively mounted to a tuner disposed on the headstock. The strings are raised above a surface of the stringed musical instrument by the bridge at the first end and by a nut disposed on the neck in proximity to the second end. The bridge and the nut define the vibrating lengths or scale lengths of the strings. The nut includes a plurality of slots corresponding to the plurality of strings. The nut slots define the spacing of the strings across a width of the neck and position the strings at a preferred or desired height above a fingerboard or fretboard defined or mounted on the neck. The height separating the strings and the fingerboard or fretboard is commonly referred to as string action. The strings are plucked, strummed or bowed to cause vibration of the strings and to produce a musical tone.

The neck of the stringed musical instrument includes a series of raised elements or frets that divide the length of the neck into fixed segments at intervals related to an intonation of the instrument. Example materials used to construct frets include metal strips that are inserted into the fingerboard, and pieces of string tied around the fingerboard. The ends and edges of each fret are rounded and shaped defining a fret crown. Pressing a string against the fret crown reduces the vibrating length of the string and thereby changes the pitch of the vibrating string.

It is known to one skilled in the art, such as for example a musician or a luthier, that placement of the strings at an improper height above the fingerboard or fretboard changes the pitch of the vibrating string and negatively alters the intonation of the instrument. For example, placing the strings too high above the fingerboard or fretboard causes the act of pressing the string down to the desired fret to stretch the string thereby raising the pitch and unbalancing the intonation of the instrument. In contrast, placing the strings too low above the fingerboard or fretboard causes a buzzing effect known as string buzzing. Typically, a novice simply uses a ruler to measure the height of the strings above the fingerboard or fretboard. Typically, a musician or luthier uses a set of stacked feeler gauges to accurately measure and define a preferred or desired height of the strings above the fingerboard or fretboard. Such a set of stacked feeler gauges typically includes ten or more individual gauges of which several must be selected and used for each respective measurement of a string height. Thus, taking several measurements of the string height for each string while installing the nut and forming the nut slots, and taking additional measurements of the string height or string action of each string at each fret, is an inefficient and laborious process. Moreover, the setting of the string action is even more arduous if the frets are improperly crowned.

SUMMARY OF THE INVENTION

In one aspect, the present invention is directed to a single-tool step gauge for measuring or setting a preferred or desired height of a string above a surface of a stringed musical instrument. In one embodiment, the single-tool step gauge comprises a nut slot gauge, a crown height gauge, and a string action gauge.

In one embodiment of the single-tool step gauge of the present invention, the nut slot gauge comprises a downwardly-extending tab and a first plurality of integrally-formed graduated length gauges that measure a nut slot height in relation to the downwardly-extending tab. A first plurality of measurement indications corresponds to the first plurality of integrally-formed graduated length gauges.

In another embodiment of the single-tool step gauge of the present invention, the crown height gauge comprises a first foot and a second foot, and a second plurality of integrally-formed graduated length gauges that measure a fret crown height in relation to at least one of the first foot or the second foot. A second plurality of measurement indications corresponds to the second plurality of integrally-formed graduated length gauges.

In another embodiment of the single-tool step gauge of the present invention, the string action gauge comprises a third plurality of graduated length gauges that measure a string action in relation to a base. A third plurality of measurement indications corresponds to the third plurality of integrally-formed graduated length gauges.

In another aspect, the present invention is directed to a method for measuring and setting a proposed height for a string from a surface of a stringed musical instrument. The method includes providing a single-tool step gauge including an integrally-formed a nut slot gauge, an integrally-formed crown height gauge, and an integrally-formed string action gauge, and using at least one of the integrally-formed gauges.

In one embodiment of the method of the present invention, the method includes binging the nut slot gauge into contact with a fretboard of the instrument and positioning a downwardly-extending tab of the nut slot gauge onto a surface of the fretboard. The method further includes rotating the nut slot gauge about a selected fret on the fretboard such that a first plurality of integrally-formed graduated length gauges are disposed in a selected one of a plurality of nut slots defined on the fretboard, sliding the downwardly-extending tab toward the plurality of nut slots until one of the plurality of integrally-formed graduated length gauges blocks further movement of the downwardly-extending tab, and reading a measurement indication of the one of the first plurality of integrally-formed graduated length gauges.

In another embodiment of the method of the present invention, the method includes binging the crown height gauge into contact with the fretboard of the instrument and positioning a first foot and a second foot of the crown height gauge squarely onto the surface of the fretboard over a selected fret, moving the crown height gauge in a first selected one of a forward direction toward a headstock of the instrument and backward direction toward a body of the instrument until one of a second plurality of integrally-formed graduated length gauges blocks further movement of the crown height gauge in the first selected direction, reading a measurement indication of the one of the second plurality of integrally-formed graduated length gauges aligned with the selected fret, moving the crown height gauge in a second selected one of the forward and backward direction until another one of the second plurality of integrally-formed graduated length gauges blocks further movement of the crown height gauge in the second selected direction, and reading a measurement indication of the other one of the second plurality of integrally-formed graduated length gauges aligned with the selected fret.

In another embodiment of the method of the present invention, the method includes binging the string action gauge into contact with the fretboard of the instrument and positioning the string action gauge onto the surface of the fretboard over a selected pair of frets, and reading a set of measurement indications corresponding to a position of a selected string of the instrument.

BRIEF DESCRIPTION OF THE DRAWINGS

The features and advantages of the present invention will be better understood when the Detailed Description of the Preferred Embodiments given below is considered in conjunction with the figures provided, wherein.

In these figures, like structures are assigned like reference numerals, but may not be referenced in the description for all figures.

DETAILED DESCRIPTION OF THE PREFERRED EMBODIMENTS

Figure 1A:
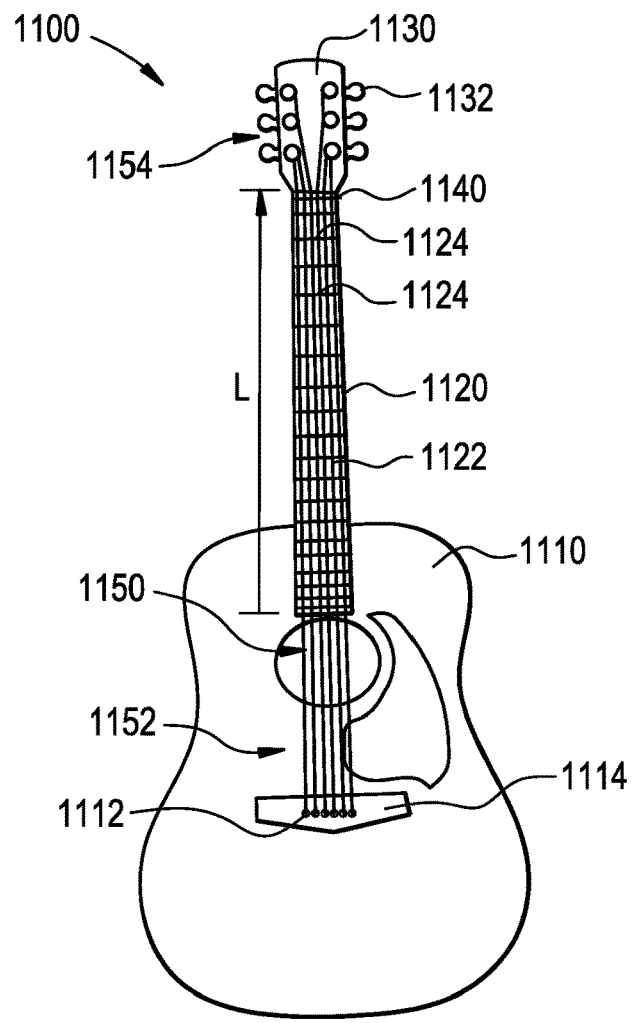
FIG. 1A is a front view of a conventional stringed musical instrument, namely, a six-string acoustic guitar.
Figure 1B:
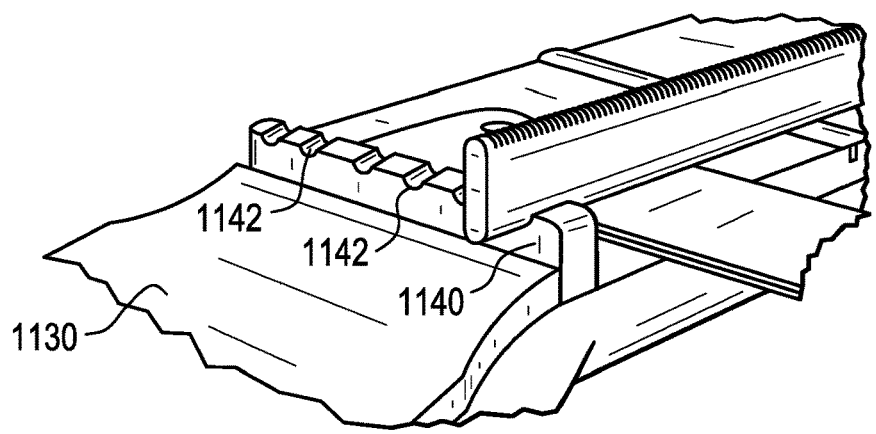
FIG. 1B is a perspective view of a tool forming a slot in a nut of a conventional stringed musical instrument.

As shown in FIGS. 1A and 1B, a conventional stringed musical instrument, such as for example, a six-stringed acoustic guitar 1100, includes a body 1110, a neck 1120 and a headstock 1130. A plurality of strings 1150 extends from a first end 1152 to a second end 1154, namely, from the body 1110, along a length L of the neck 1120, to the headstock 1130. The first end of each of the plurality of strings is respectively mounted to one of a plurality of bridge pins 1112 on a bridge 1114 disposed on the body 1110 and the second end of each of the strings is respectively mounted to one of a plurality of tuners 1132 disposed on the headstock 1130. The strings 1150 are raised to a preferred or desired height above a surface of the guitar 1100 by the bridge 1114 at the first end 1152 and by a nut 1140 at the second end 1154. The bridge 1114 and the nut 1140 define a vibrating length or scale length of the each of the plurality of strings 1150.

The nut 1140 includes a plurality of nut slots 1142 corresponding to the plurality of strings 1150. The nut slots 1142 define the spacing between each of the plurality of strings 1150 across a width of the neck 1120 and position the strings 1150 at a preferred or desired height above a surface of a fingerboard or fretboard 1122 defined or mounted on the neck 1120. The height separating the strings and the surface of the fingerboard or fretboard 1122 is commonly referred to as string action and is referred to herein as "string action."

The neck 1120 of the guitar 1100 includes a series of raised elements or frets 1124 disposed on or in the neck 1120 and projecting upwardly from the surface of the neck 1120. The frets 1124 divide the length L of the neck 1120 into fixed segments at intervals related to a particular intonation of the guitar 1100. Example materials used to comprise the frets 1124 include metal strips that are inserted into the fingerboard, and pieces of string tied around the fingerboard. The ends and edges of each fret 1124 that project upwardly from the surface of the fingerboard or fretboard 1122 are rounded and shaped defining a fret crown. Pressing a string 1150 against a crowned fret 1124 reduces the vibrating length of the string 1150 and thereby changes the pitch of the vibrating string.

The present invention provides an apparatus and a method for measuring or setting a preferred or desired height of a string 1150 above a surface of a stringed instrument. A single-tool step gauge according to the present invention provides for measuring or setting the preferred or desired height, or string action, of a string above a surface of a stringed instrument, for example, a height above the crowned frets 1124 of the fingerboard or fretboard 1122. The step gauge of the present invention enables one skilled in the art, such as for example a luthier, to accurately measure or set the preferred or desired height of the strings above the fingerboard or fretboard. The step gauge provides a single tool which enables the user to take several measurements of string height while installing the nut and forming the nut slots, and take additional measurements of string height at each fret. As a result, the time and labor required to accurately measure or define the preferred or desired height of the strings above the fingerboard or fretboard are substantially reduced. Accurately measuring or defining the preferred or desired height of the strings above the fingerboard or fretboard is now completed in an efficient and simple process. Moreover, the single-tool step gauge of the present invention measures the crowning of the frets to determine if the fret crown height is consistent to a preferred or desired height. By using the single-tool step gauge of the present invention, both a novice and a musician or luthier can accurately measure or define the preferred or desired height of the strings above the fingerboard or fretboard.

Figure 2:
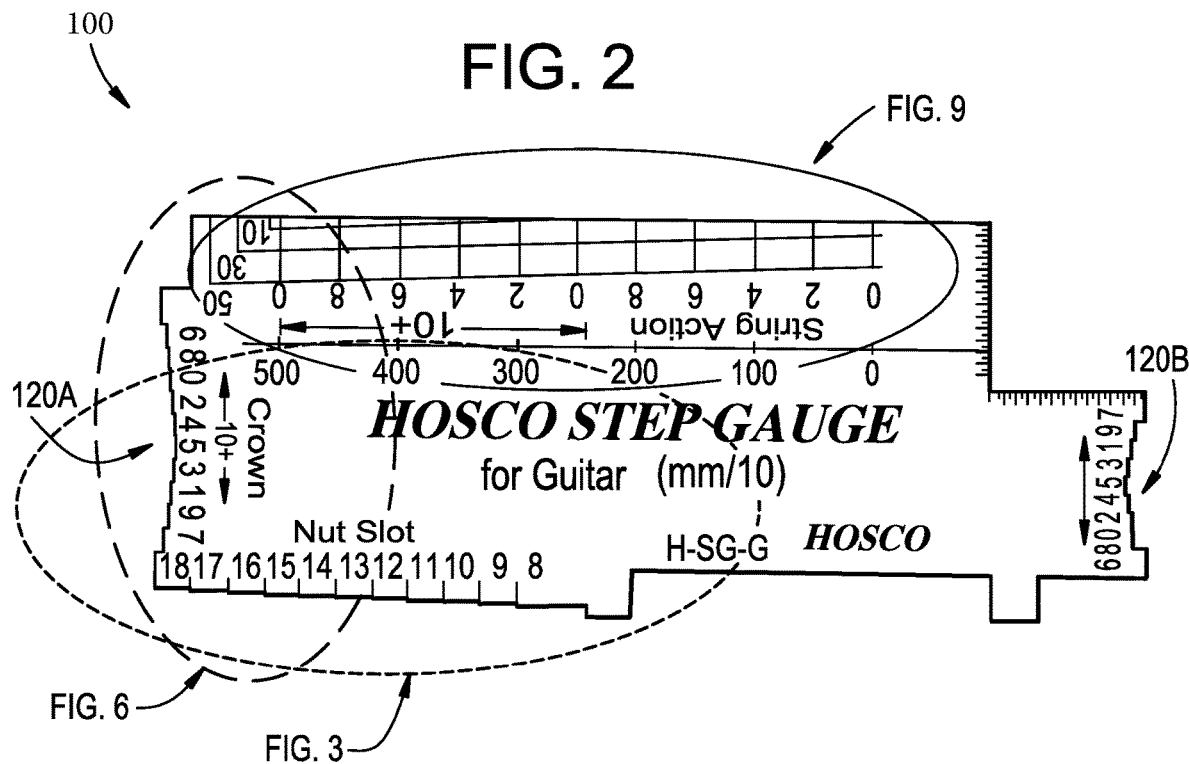
FIG. 2 is a front view of a single-tool step gauge for a stringed musical instrument in accordance with of one embodiment of the present invention.
Figure 3:
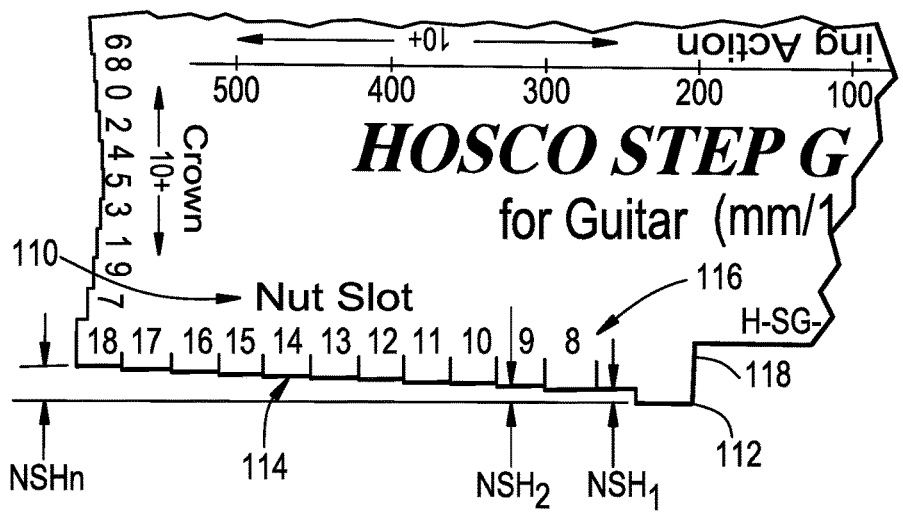
FIG. 3 is a detail view of a portion of the step gauge of FIG. 2, namely, a nut slot gauge.
Figure 6:
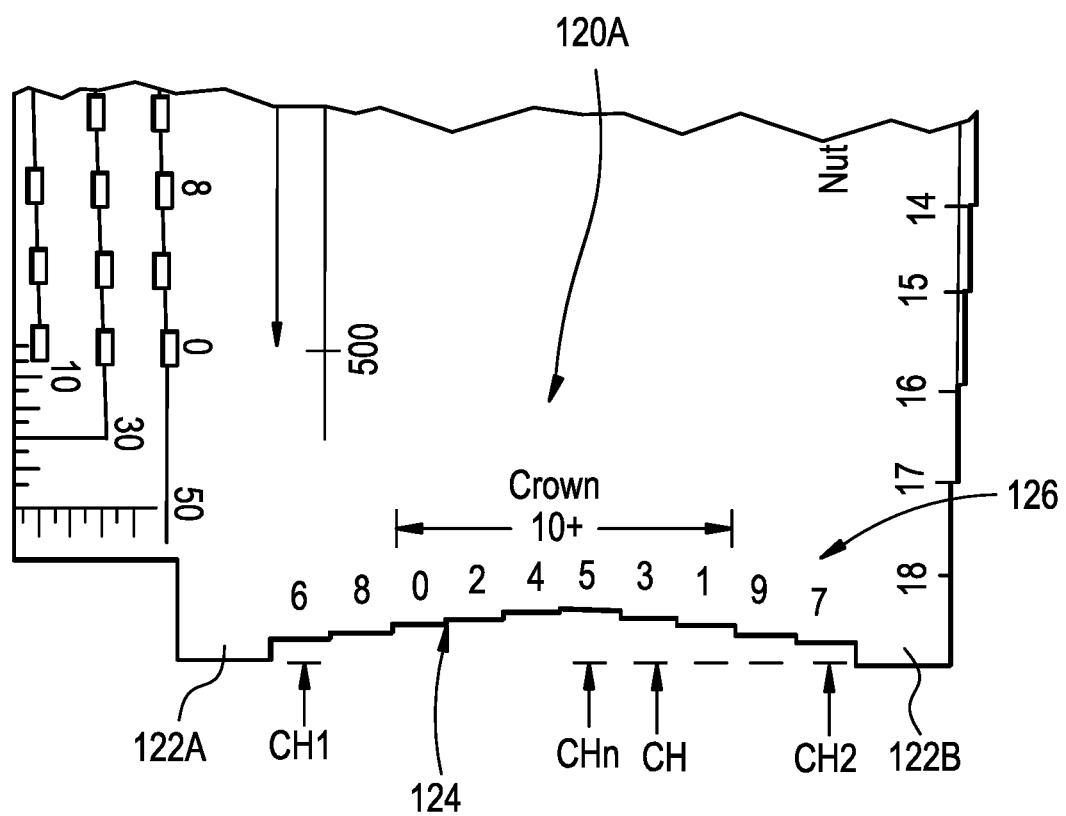
FIG. 6 is a detail view of a portion of the step gauge of FIG. 2, namely, a crown height gauge.
Figure 9:
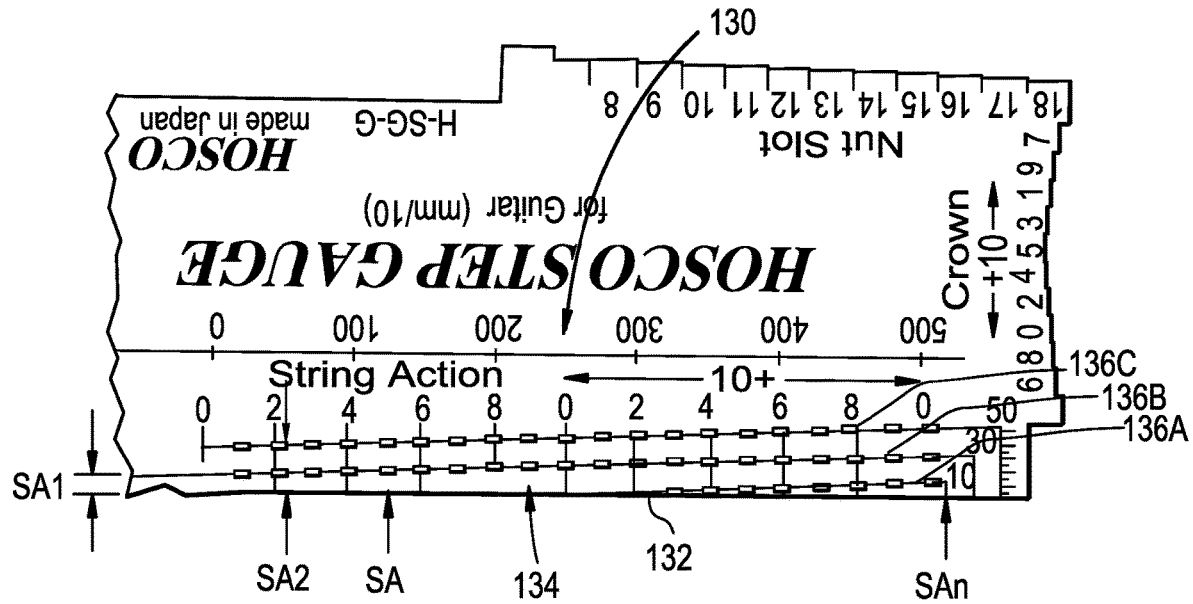
FIG. 9 is a detail view of a portion of the step gauge of FIG. 2, namely, a string action gauge.

One embodiment of the present invention is shown in FIG. 2 and is referred to herein as "step gauge 100." Details of portions of the step gauge 100 are illustrated in FIGS. 3, 6 and 9, such portions being identified in FIG. 1 with corresponding labels "FIG. 3," "FIG. 6" and "FIG. 9."

Figure 4:
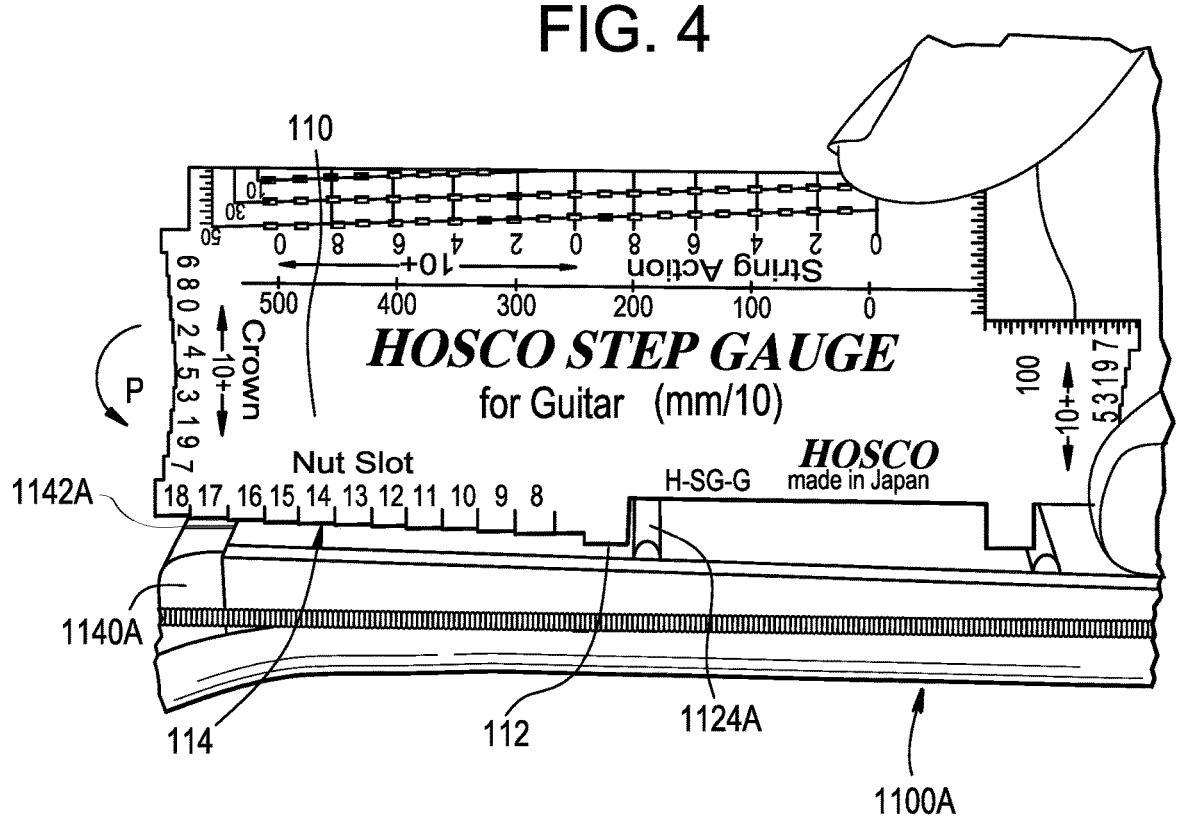
FIG. 4 is a front perspective view illustrating use of the nut slot gauge of FIG. 3 in a method performed in accordance with one embodiment of the present invention.
Figure 5:
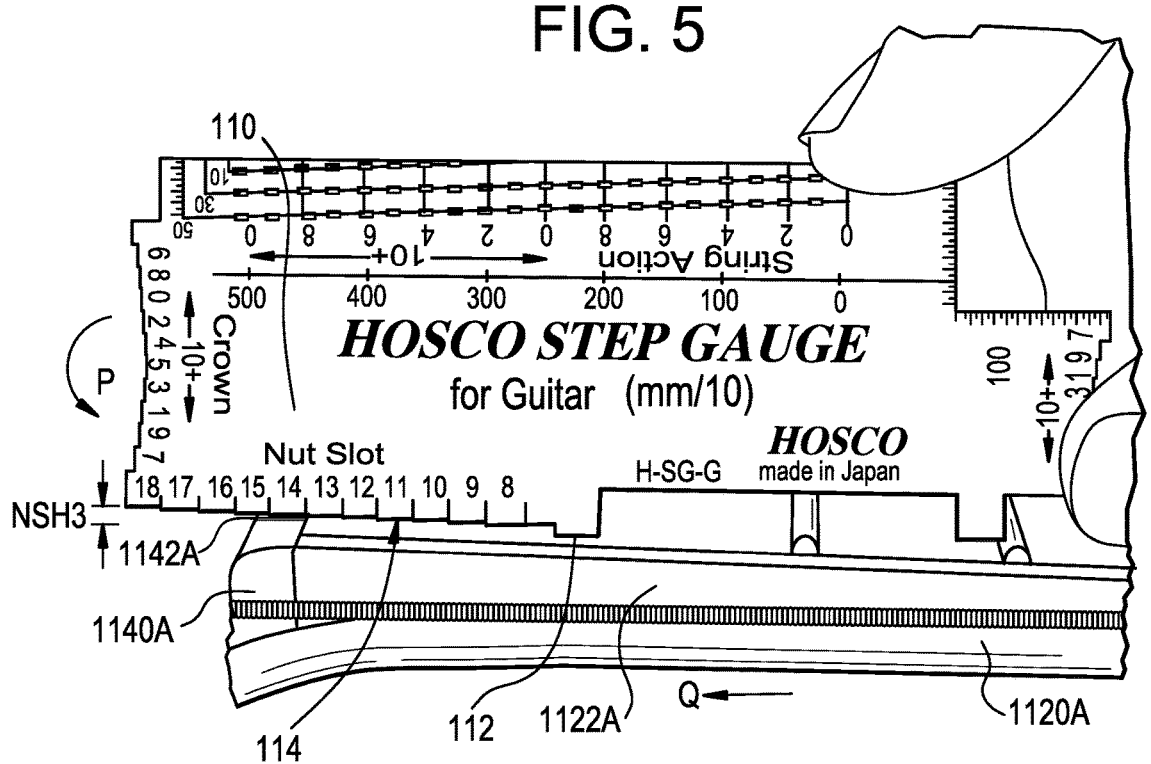
FIG. 5 is a front perspective view illustrating use of the nut slot gauge of FIG. 3 in a method performed in accordance with another embodiment of the present invention.

In one embodiment, and as shown in FIGS. 3, 4 and 5, the step gauge 100 includes a nut slot gauge 110. The nut slot gauge 110 includes a base or downwardly-extending tab 112 and a series of integrally-formed graduated length gauges 114 that measure a nut slot height NSH in an increasing manner in relation to the tab 112 extending forwardly or away from the tab 112 to a forward end of the nut slot gauge 110. The graduated length gauges 114 include a corresponding series of measurement indications 116. For example, nut slot height NSH1 indicates a height of 0.8 mm in relation to the tab 112; and nut slot height NSH2 indicates an increased height of 0.9 mm in relation to the tab 112 and to NSH1. Similarly, nut slot height NSHn indicates an increased height of "n" mm, at the point the nut slot height NSHn is desired to be measured, in relation to the tab 112 and to previous nut slot heights (e.g., NSH1, NSH2, etc.). In one embodiment, the nut slot gauge 110 also includes a backstop 118 disposed proximate the tab 112.

Figure 11:
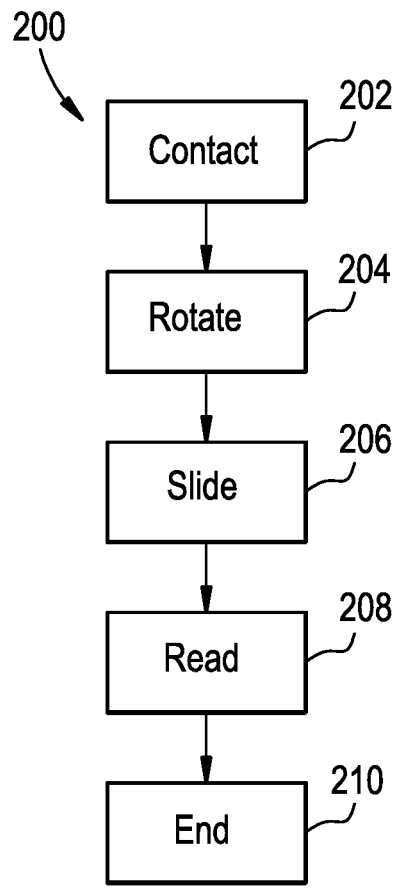
FIG. 11 is a flowchart of one embodiment of a method of use of the nut slot gauge of FIG. 3.

One embodiment of a method of use of the nut slot gauge 110 is shown in FIGS. 4, 5 and 11. The method 200 includes a number of steps illustrated in FIG. 11, as described below. In one embodiment, the method includes all of the steps in the order described. However, the method may include fewer than all of the steps and/or the steps may be performed in a different order. The method is described in conjunction with a guitar 1100A having a nut 1140A, but is not limited thereto and may be applicable to any stringed musical instrument having a nut. The guitar 1100A is constructed similarly to guitar 1100 of FIG. 1A, where like reference numbers have a suffix "A".

In a Contact step 202, the nut slot gauge 110 is brought into contact with a fretboard 1122A disposed on a neck 1120A of the guitar 1100A. The tab 112 is positioned flat or squarely onto a surface of the fretboard 1122A, for example, a top or upper surface of the fretboard 1122A. In one embodiment, the tab 112 is positioned squarely onto the fretboard 1122A such that the backstop 118 is disposed adjacent to a first fret 1124A nearest the nut 1140A. In a Rotate step 204, the nut slot gauge 110 is rotated about the first fret 1124A in the direction indicated by arrow P such that the graduated length gauges 114 are disposed in a selected one of a plurality of nut slots 1142A as shown in FIG. 4. In a Slide step 206, the downwardly-extending tab 112 of the nut slot gauge 110 is moved or slid toward the nut 1140A in the direction indicated by arrow Q toward the plurality of nut slots 1142A as shown in FIG. 5 until the one of the graduated length gauges 114 obstructs or blocks further movement of the nut slot gauge 110 in the direction indicated by arrow Q. In a Read step 208, the indication of the nut slot height NSH of the selected one of the plurality of nut slots 1142A is obtained by reading the measurement indication 116 of the graduated length gauge 114 resting in the selected nut slot 1142A and, if desired, recorded. As shown in FIG. 5, the nut slot height NSH3 of the selected nut slot 1142A indicates a height of 1.2 mm in relation to the tab 112. The method 200 is ended at End step 210. The method 200 may be repeated to assess further work performed on the selected nut slot 1142A or to measure the nut slot height of other ones of the plurality of nut slots 1142 for consistency or uniformity therebetween.

Figure 7:
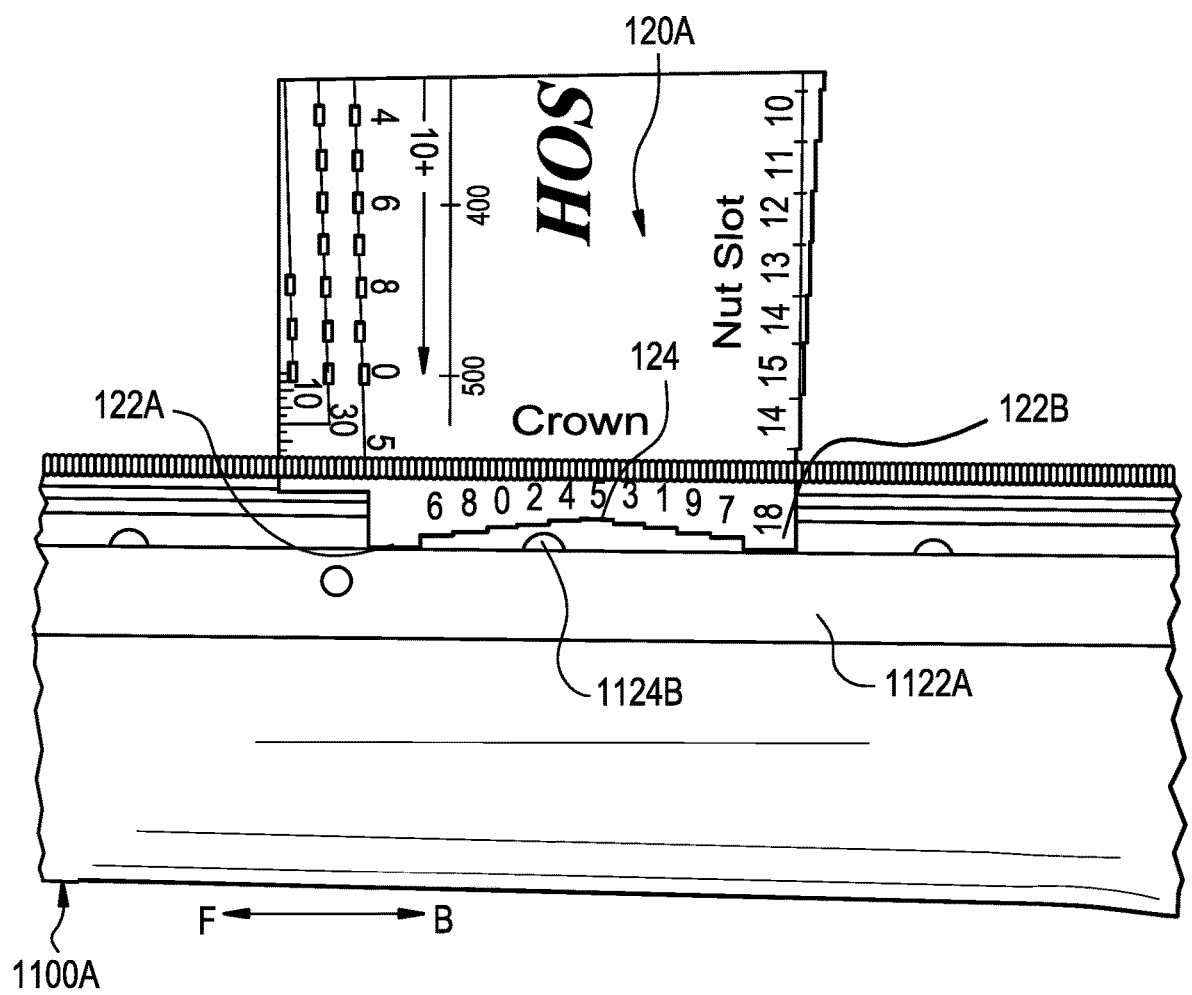
FIG. 7 is a front perspective view illustrating use of the crown height gauge of FIG. 6 in a method performed in accordance with one embodiment of the present invention.
Figure 8:
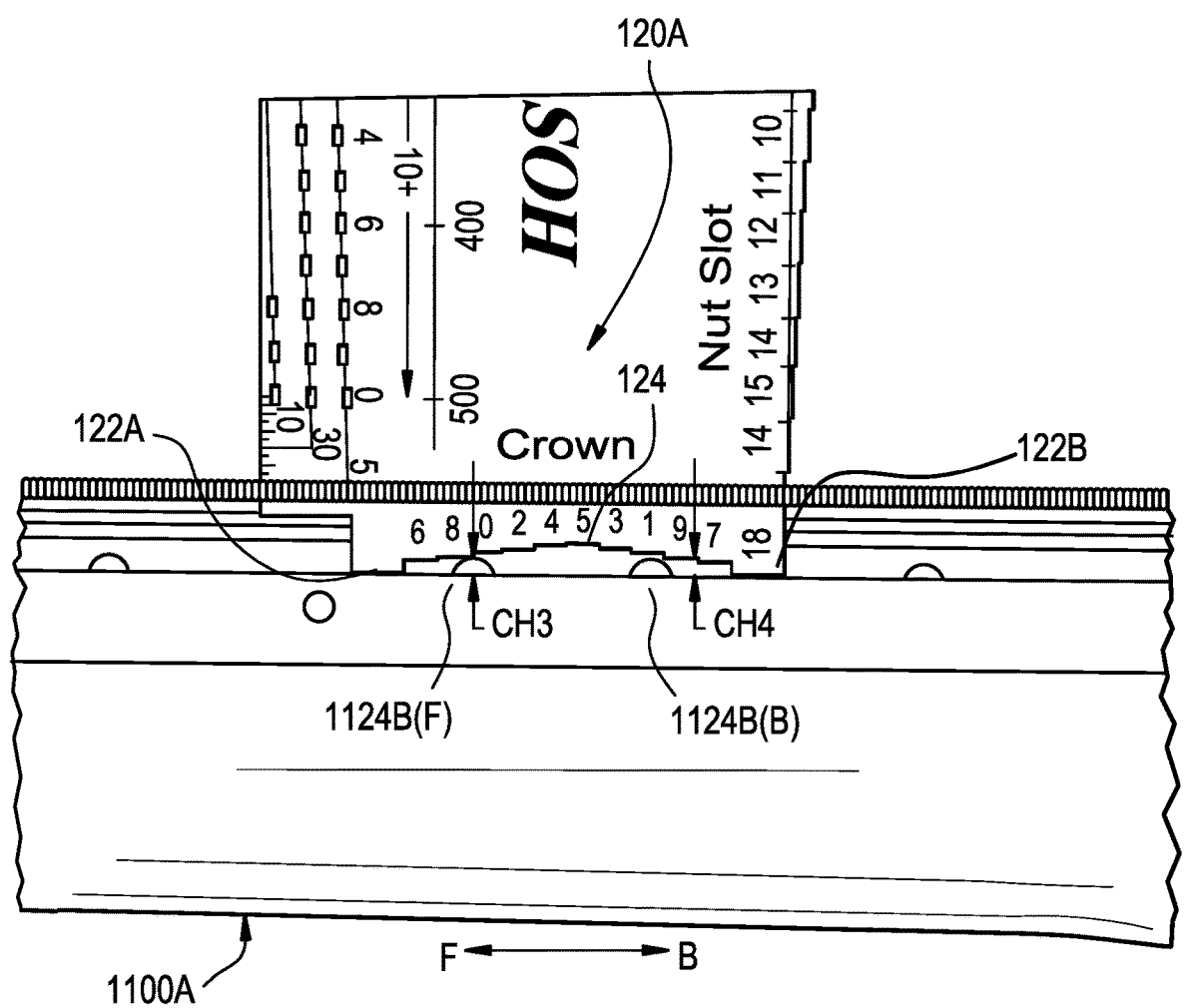
FIG. 8 is a front perspective view illustrating use of the crown height gauge of FIG. 6 in a method performed in accordance with another embodiment of the present invention.

In one embodiment, as shown in FIG. 2, the step gauge 100 includes a crown height gauge 120A which is sized and configured for measuring a height of a fret of a stringed instrument, such as for example the guitar 1100. In one embodiment, as further shown in FIG. 2, the step gauge 100 includes more a second crown height gauge 120B which is sized and configured for measuring a height of a fret of another stringed instrument having a differing size neck and frets than the guitar 1100, such as for example a mandolin, lute or ukulele. In one embodiment, and as shown in FIGS. 6, 7 and 8, the crown height gauge 120A includes a pair of bases or feet, a first foot 122A and a second foot 122B, and a series of integrally-formed graduated length gauges 124 that measure a crown height CH of a fret in relation to the feet 122A and 122B. The graduated length gauges 124 approximate a "stepped-pyramid" shape, and include a corresponding series of measurement indications 126. In one embodiment, the measurement indications 126 are set on a first side of the crown height gauge 120A respectively at a height in relation to foot 122A of 0.6 mm, 0.8 mm, 1.0 mm (the label "0" indicating 1.0 mm), 1.2 mm, 1.4 mm and 1.5 mm. Similarly, the measurement indications 126 are set on a second side of the crown height gauge 120A respectively at a height in relation to foot 122B of 0.7 mm, 0.9 mm, 1.1 mm, 1.3 mm and 1.5 mm. For example, crown height CH1 indicates a height of 0.6 mm in relation to foot 122A; and crown height CH2 indicates a height of 0.7 mm in relation to foot 122B. Similarly, crown height CHn indicates a height of "n" mm, at the point the crown height CHn is desired to be measured, in relation to either one or both of the feet 122A and 122B.

Figure 12:
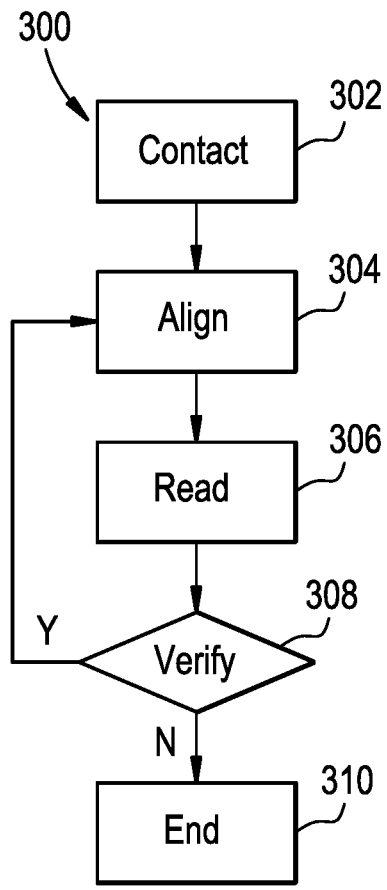
FIG. 12 is a flowchart of one embodiment of a method of use of the crown height gauge of FIG. 6.

One embodiment of a method of use of the crown height gauge 120A is shown in FIGS. 7, 8 and 12. The method 300 includes a number of steps illustrated in FIG. 12, as described below. In one embodiment, the method includes all of the steps in the order described. However, the method may include fewer than all of the steps and/or the steps may be performed in a different order. The method is described in conjunction with the guitar 1100A having the fretboard 1122A and a fret 1124B, but is not limited thereto and may be applicable to any stringed musical instrument having frets.

In Contact step 302, the crown height gauge 120A is brought into contact with the fretboard 1122A and positioned over, or straddling, the fret 1124B. The feet 122A and 122B are positioned flat or squarely onto a surface of the fretboard 1122A. In one embodiment and as shown in FIGS. 7 and 8, the crown height gauge 120A is positioned on the fretboard 1122A such that foot 122A is disposed toward a headstock 1130A (not shown) of the guitar 1100A, and foot 122B is disposed toward a body 1110A (not shown) of the guitar 1100A. In an Align step 304, the crown height gauge 120A is moved in a selected one of the directions forward toward the headstock indicated by the arrow F, and backward toward the body indicated by the arrow B. The crown height gauge 120A is moved in a selected direction forward or backward along the fretboard 1122A until one of graduated length gauges 124 aligns with the fret 1124B such that the fret 1124B obstructs or blocks further movement of the crown height gauge 120A in the selected direction. In a Read step 306, the indication of the crown height CH is obtained by reading the measurement indication 126 of the graduated length gauge 124 resting on the fret 1124B and, if desired, recorded.

For example, as shown in FIGS. 7 and 8, in Align step 304, the crown height gauge 120A is moved backward along the fretboard 1122A until one of graduated length gauges 124 aligns with the fret 1124B such that the fret 1124B obstructs or blocks further backward movement of the crown height gauge 120A. In the illustrated embodiment, backward movement of the crown height gauge 120A is blocked from further backward movement proximate to the foot 122A at the graduated length gauge 124 labelled "8". In Read step 306, the indication of the crown height CH is obtained by reading the measurement indication 126 of the graduated length gauge 124 resting on the fret 1124B. In the illustrated embodiment, the crown height CH3 of the fret 1124B at (F) proximate to the foot 122A indicates a height greater than 0.8 mm and less than or equal to 1.0 mm in relation to the foot 122A.

In Verify step 308, the indication of the crown height CH obtained in Align step 304 and Read step 306 is verified by repeating Align step 304 and Read step 306 by moving the crown height gauge 120A in the other of the directions forward or backward along the fretboard 1122A until another one of graduated length gauges 124 obstructs or blocks further movement of the crown height gauge 120A in such direction. Continuing with the example shown in FIGS. 7 and 8, in Verify step 308, Align step 304 is repeated by moving the crown height gauge 120A forward along the fretboard 1122A until one of graduated length gauges 124 aligns with the fret 1124B such that the fret 1124B obstructs or blocks further forward movement of the crown height gauge 120A. Continuing with Verify step 308, Read step 306 is repeated and the indication of the crown height CH is obtained by reading the measurement indication 126 of the graduated length gauge 124 resting on the fret 1124B. It is anticipated that forward movement of the crown height gauge 120A will be blocked from further forward movement proximate to the foot 122B at the graduated length gauge 124 labelled "9" or the graduated length gauge 124 labelled "7." If forward movement of the crown height gauge 120A is blocked at the graduated length gauge 124 labelled "9," then the crown height CH4 of the fret 1124B at (B) is 1.0 mm. Instead, if forward movement of the crown height gauge 120A extends beyond the graduated length gauge 124 labelled "9" and instead is blocked at the graduated length gauge 124 labelled "7," then the crown height CH4 of the fret 1124B at (B) is 0.9 mm. In the illustrated embodiment, the crown height CH4 of the fret 1124B at (B) proximate to the foot 122B is blocked at the graduated length gauge 124 labelled "9," and thus indicates a height greater than 0.9 mm and less than or equal to 1.1 mm in relation to the foot 122A.

feet 122. Thus, the crown height CH of the fret 1124 equals 1.0 mm. Verify step 308, or repeating Align step 304 and Read step 306, may be performed several times for the designated fret (e.g., moving the crown height gauge 120A forward or backward along the fretboard 1122A over fret 1124B) until the method is ended at End step 310.

The method 300 of using the crown height gauge 120A, including Verify step 308, or repeating Align step 304 and Read step 306, provides a simple, efficient, repeatable and verifiable method for measuring the crown height CH of a fret 1124 of the guitar 1100 as well as for measuring a crown height of a fret of most conventional stringed musical instruments.

In one embodiment and as shown in FIG. 2, one or more or all of the nut slot gauge 110, the crown height gauges 120A and 120B, and the string action gauge 130 is integrally-formed with the single-tool step gauge 100. In one embodiment and as shown in FIGS. 2 and 3, the forward end of the nut slot gauge 110 is integrally formed with the second foot 122A of the crown height gauge 120A.

Figure 10:
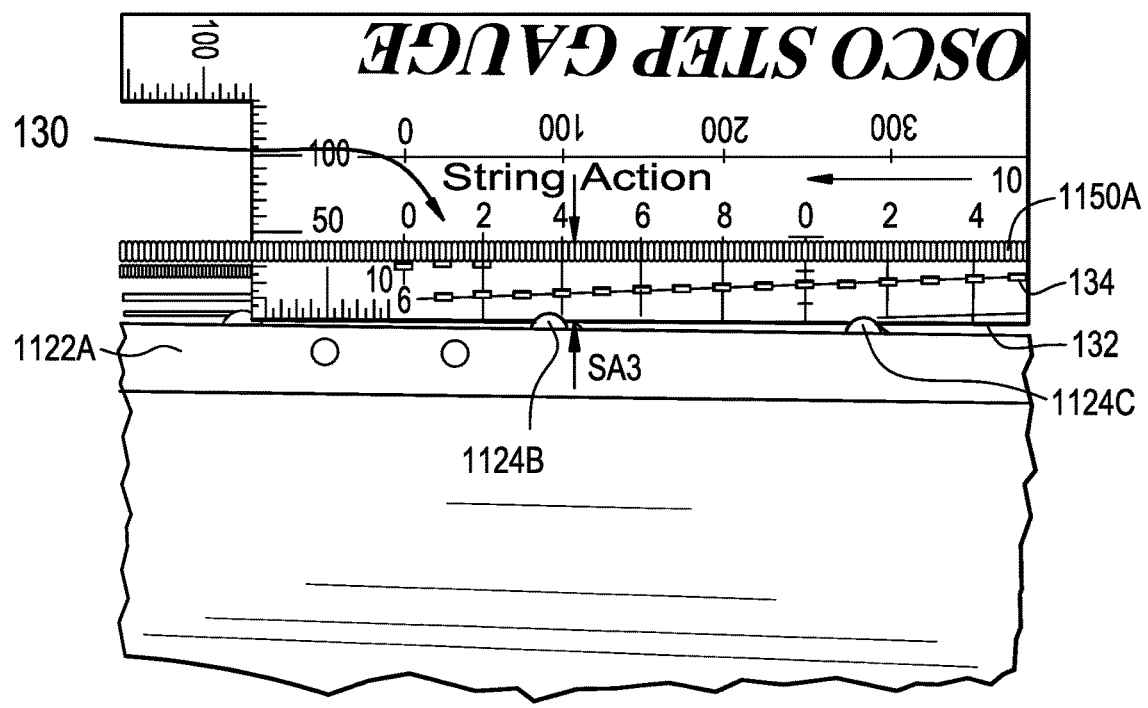
FIG. 10 is a front perspective view illustrating use of the string action gauge of FIG. 9 in a method performed in accordance with one embodiment of the present invention.

In one embodiment, and as shown in FIGS. 9 and 10, the step gauge 100 includes a string action gauge 130. The string action gauge 130 includes a base 132 and a series of graduated length gauges 134 that measure a height or string action SA in an increasing manner in relation to the base 132. The graduated length gauges 134 include a corresponding series of measurement indications 136A and 136B that are cumulative. For example, in FIG. 9, string action SA1 indicates a height of 1 mm in relation to the base 132 by adding the measurement indication 136A of 1 mm and the measurement indication 136B of zero (0) mm; and string action SA2 indicates a height of 3.2 mm in relation to the base 132 by adding the measurement indication 136A of 3 mm and the measurement indication 136B of 0.2 mm. Similarly, string action SAn indicates a height of "n" mm in relation to the base 132 by adding the measurement indication 136A and the measurement indication 136B at the point the string action SAn is desired to be measured.

Figure 13:
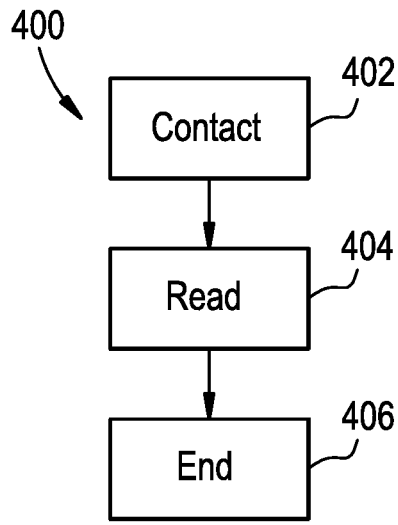
FIG. 13 is a flowchart of one embodiment of a method of use of the string action gauge of FIG. 9.

One embodiment of a method of use of the string action gauge 130 is shown in FIGS. 10 and 13. The method is described in conjunction with the guitar 1100A having the fretboard 1122A, frets 1124B and 1124C, and a string 1150A, but is not limited thereto and may be applicable to any stringed musical instrument having frets and strings.

In a Contact step 402, the string action gauge 130 is brought into contact with a surface of the fretboard 1122A and positioned over, or straddling, frets 1124B and 1124C (FIG. 10). In a Read step 404, the indication of the string action is obtained by reading the measurement indications 136A and 136B relative to the string 1150A and, if desired, recorded. For example, and as shown in FIG. 10, the string action SA3 of the string 1150A at the fret 1124B indicates a height of 3.4 mm in relation to the base 132 by adding the measurement indication 136A of 3 mm and the measurement indication 136B of 0.4 mm. The method 400 may be repeated to measure the string action of the string 1150A at other frets or to measure the sting action of other strings. In one embodiment, the measurement indications 136B are provided as slits 136C in the string action gauge 130 such that the measurement indication 136B can be obtained by observing which slits 136C are blocked by the string 1150A. The method 400 is ended at End step 406.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above-detailed description, but that the invention will include all embodiments falling within the scope of the appended claims.

What is claimed is:

1. A single-tool step gauge for measuring and setting a proposed height for a string from a surface of a stringed musical instrument, the single-tool step gauge comprising:
    a nut slot gauge;
    a crown height gauge; and
    a string action gauge.

2. The single-tool step gauge of claim 1, wherein the nut slot gauge comprises:
    a downwardly-extending tab;
    a first plurality of integrally-formed graduated length gauges that measure a nut slot height in relation to the downwardly-extending tab; and
    a first plurality of measurement indications corresponding to the first plurality of integrally-formed graduated length gauges.

3. The single-tool step gauge of claim 1, wherein the crown height gauge comprises:
    a first foot and a second foot;
    a second plurality of integrally-formed graduated length gauges that measure a fret crown height in relation to at least one of the first foot or the second foot; and
    a second plurality of measurement indications corresponding to the second plurality of integrally-formed graduated length gauges.

4. The single-tool step gauge of claim 2, wherein the crown height gauge comprises:
    a first foot and a second foot;
    a second plurality of integrally-formed graduated length gauges that measure a fret crown height in relation to at least one of the first foot or the second foot; and
    a second plurality of measurement indications corresponding to the second plurality of integrally-formed graduated length gauges.

5. The single-tool step gauge of claim 1, wherein the string action gauge comprises:
    a third plurality of graduated length gauges that measure a string action in relation to a base, and
    a third plurality of measurement indications corresponding to the third plurality of integrally-formed graduated length gauges.

6. The single-tool step gauge of claim 4, wherein the string action gauge comprises:
    a third plurality of graduated length gauges that measure a string action in relation to a base, and
    a third plurality of measurement indications corresponding to the third plurality of integrally-formed graduated length gauges.

7. The single-tool step gauge of claim 3, wherein:
    a forward end of the nut slot gauge is integrally formed with the second foot of the crown height gauge.

8. The single-tool step gauge of claim 6, wherein:
    the nut slot gauge is integrally-formed with the single-tool step gauge;
    the crown height gauge is integrally-formed with the single-tool step gauge; and
    the string action gauge is integrally-formed with the single-tool step gauge.

9. The single-tool step gauge of claim 1, further comprising:
    a second crown height gauge.

10. The single-tool step gauge of claim 8, further comprising:
    a second crown height gauge integrally-formed with the single-tool step gauge.

11. A nut slot gauge for measuring and setting a proposed height for a string from a surface of a stringed musical instrument, the nut slot gauge comprising:
    a downwardly-extending tab;
    a plurality of integrally-formed graduated length gauges that measure a nut slot height in relation to the downwardly-extending tab; and
    a plurality of measurement indications corresponding to the plurality of integrally-formed graduated length gauges.

12. A crown height gauge for measuring and setting a proposed height for a string from a surface of a stringed musical instrument, the crown height gauge comprising:
    a first foot and a second foot;
    a plurality of integrally-formed graduated length gauges that measure a fret crown height in relation to at least one of the first foot or the second foot; and
    a plurality of measurement indications corresponding to the plurality of integrally-formed graduated length gauges.

13. A string action gauge for measuring and setting a proposed height for a string from a surface of a stringed musical instrument, the string action gauge comprising:
    a plurality of graduated length gauges that measure a string action in relation to a base, and
    a plurality of measurement indications corresponding to the plurality of integrally-formed graduated length gauges.

14. A method for measuring and setting a proposed height for a string from a surface of a stringed musical instrument, the method comprising:
    providing a single-tool step gauge including an integrally-formed nut slot gauge, an integrally-formed crown height gauge, and an integrally-formed string action gauge; and
    at least one of:
        binging the nut slot gauge into contact with a fretboard of the instrument and positioning a downwardly-extending tab of the nut slot gauge onto a surface of the fretboard, rotating the nut slot gauge about a selected fret on the fretboard such that a first plurality of integrally-formed graduated length gauges are disposed in a selected one of a plurality of nut slots defined on the fretboard, sliding the downwardly-extending tab toward the plurality of nut slots until one of the plurality of integrally-formed graduated length gauges blocks further movement of the downwardly-extending tab, and reading a measurement indication of the one of the first plurality of integrally-formed graduated length gauges;
        binging the crown height gauge into contact with the fretboard of the instrument and positioning a first foot and a second foot of the crown height gauge squarely onto the surface of the fretboard over a selected fret, moving the crown height gauge in a first selected one of a forward direction toward a headstock of the instrument and backward direction toward a body of the instrument until one of a second plurality of integrally-formed graduated length gauges blocks further movement of the crown height gauge in the first selected direction, reading a measurement indication of the one of the second plurality of integrally-formed graduated length gauges aligned with the selected fret, moving the crown height gauge in a second selected one of the forward and backward direction until another one of the second plurality of integrally-formed graduated length gauges blocks further movement of the crown height gauge in the second selected direction, and reading a measurement indication of the other one of the second plurality of integrally-formed graduated length gauges aligned with the selected fret; and binging the string action gauge into contact with the fretboard of the instrument and positioning the string action gauge onto the surface of the fretboard over a selected pair of frets, and reading a set of measurement indications corresponding to a position of a selected string of the instrument.

* * * * *